Oct. 1, 1968

R. L. MORDEN 3,403,582

LIMITED SLIP DIFFERENTIAL

Filed July 25, 1966

INVENTOR.
Russell L. Morden
BY
Robert G. Outland
ATTORNEY

Oct. 1, 1968    R. L. MORDEN    3,403,582
LIMITED SLIP DIFFERENTIAL
Filed July 25, 1966    2 Sheets-Sheet 2

INVENTOR.
Russell L. Morden
BY
Robert J. Outland
ATTORNEY

United States Patent Office 3,403,582
Patented Oct. 1, 1968

3,403,582
LIMITED SLIP DIFFERENTIAL
Russell L. Morden, Lansing, Mich., assignor to General Motors Corporation, Detroit, Mich., a corporation of Delaware
Filed July 25, 1966, Ser. No. 567,434
11 Claims. (Cl. 74—711)

ABSTRACT OF THE DISCLOSURE

A preferred embodiment comprises a compact limited slip differential having a clutch pack located between and frictionally connecting the differential pinion gears. Spring preload means in the clutch pack give a predetermined initial resistance to differential action. This resistance is increased in proportion to driving torque applied to the differential by outward movement of the pinion gears caused by gear separating forces. The outward gear movement further compresses the clutch pack to increase its frictional resistance. Both plate and cone clutch versions are disclosed.

---

This invention relates to limited slip differentials of the type commonly used in automotive vehicles for transmitting torque to the driving wheels such that a substantial amount of torque is delivered to a wheel having traction even though the other driving wheel may be slipping and incapable of absorbing substantial torque. In its more particular aspects, the invention proposes a bevel gear type differential having a clutch pack located between the side gears and connected to one of the pinion gears in engagement with the side gears, the clutch pack acting to resist relative rotation of the pinion and side gears with a minimum resistive force under all conditions, said force being increased in proportion to the driving torque applied through the pinion and side gears.

It is well known that the conventional automotive differential divides the torque supplied by the engine equally between the driving wheels on opposite sides of the vehicle. This results in the problem that when one driving wheel loses traction, as for instance when slipping on ice, the maximum torque which can be delivered to the wheel having traction is limited to that which is deliverable to the slipping wheel.

In order to overcome this problem, many types of locking and limited slip differentials have been designed which in some way provide for unequal distribution of torque to the driving wheels under predetermined conditions. A number of such differential arrangements which are in wide use today provide friction clutch means acting between one or both of the differential side gears and the differential casing to resist relative rotation of the gearing. Such clutch arrangements commonly include spring means preloading the clutch members to give a predetermined minimum resistance to differential action and further provide for increasing the engaging force on the clutch members in relation to the torque delivered to the wheels through the differential gearing. The latter may be accomplished by providing for slight axial motion of the side gears so as to compress the clutch members, such axial motion occurring as a result of the separating force of the pinion and side gears caused by the application of torque thereto.

The present invention differs from the differential arrangements discussed above in that it provides a more compact differential assembly having a clutch means located between the pinion and side gears but arranged to produce substantially the same results as the previously discussed differential arrangements. This more compact arrangement makes use of otherwise unused space between the gears and permits the overall differential package to be of smaller exterior dimension, thereby increasing the space available for other components or useful compartment volume in the vehicle.

Other features and advantages of the invention will be apparent from the following description and drawings of two embodiments selected for purposes of illustration and in which.

Figure 1:
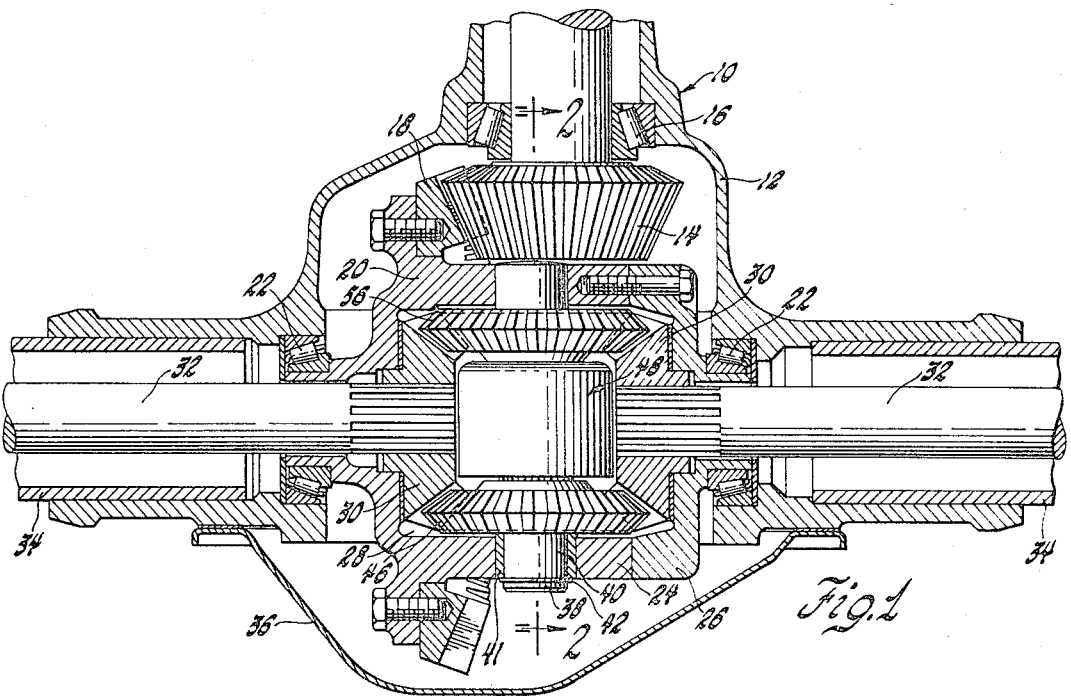
FIGURE 1 is a cross-sectional view of a rear axle assembly including a limited slip differential according to the invention.

Referring now to the drawings, numeral 10 generally indicates an axle assembly comprising an axle housing 12 carrying a drive pinion 14 rotatably mounted on roller bearings 16. The pinion 14 engages a ring gear 18 which is secured to the case 20 of a differential assembly according to the present invention. The differential case 20 is carried by roller bearings 22 for rotation within the axle housing 12 around a transverse axis and comprises separable body and cap portions 24 and 26 respectively, secured together to at least partially enclose a gear chamber 28.

Within the chamber a pair of oppositely disposed side gears 30 are carried, each splined to an axle shaft 32 to provide for driving the vehicle wheels (not shown). The axle shafts are enclosed by tubular members 34 pressed into the axle housing. The differential compartment 28 is closed by a cover member 36 secured to the rear of the axle housing so as to provide a lubricant retaining cavity within axle housing 12.

The portions of the differential construction and axle housing heretofore described are of generally conventional construction and form a part of the invention only as they are combined with the novel portions of the arrangement to be subsequently described.

Rotatably carried in the differential case 20 and extending transversely across the axis of differential rotation is a pinion shaft 38. The shaft has a lower end 40 which is of smaller diameter than the remainder thereof and carries a bearing 41 and a snap ring 42 for retaining the bearing and shaft in assembly. The lower portion of the shaft which is within cavity 28 is splined at 44 so as to rotatably connect it with a cooperatively splined pinion gear 46 and certain elements of a clutch assembly generally indicated by numeral 48 and to be subsequently described. The pinion gear 46 is in toothed engagement with side gears 30. A predetermined clearance 50 is provided between the pinion gear 46 and case 20 to permit limited axial movement of the pinion gear 46 outwardly from the side gears while the bearing 41 and snap ring 42 carry axial thrust of the pinion gear 46 to shaft 38 and cause it to move with the pinion gear.

Clutch assembly 48 includes a bell-like housing 52 having a reduced diameter upper end 54 which rotatably bears upon the upper portion of shaft 38. The outer diameter of end 54 is splined to rotatably secure the housing 52 to internal splines of a second pinion gear 56. Pinion gear 56 is thereby located on shaft 38 opposite gear 46 and also in engagement with side gears 30. An outwardly flared flange 58 at the upper end of housing 52 engages a recessed portion 60 of the pinion gear 56 to positively secure the pinion 56 and housing 52 axially to one another.

Within the lower portion of clutch assembly 48 is retained a clutch pack formed of a stack of alternately disposed internally and externally splined friction disc 62 and 64 respectively. The discs include friction surfaces in frictional engagement with one another. Externally splined discs 64 engage internal splines 66 formed internally of housing 52 and are thus rotatable with the housing. The internally splined discs 62 engage splines 44 formed on shaft 38 and are, therefore, rotatable with the shaft and, consequently, with pinion gear 46.

An annular plug member 68 is threaded into the end of housing 52 and forms a seat for one end of the clutch pack. At the other end of the clutch pack a disc member 70 having internal splines is seated against a shoulder 72 formed on shaft 38 at the termination of the splined portion to limit movement of the clutch pack in that direction.

Preload of the clutch pack is provided by a plurality of Belleville springs 74 located between an annular intermediate wall portion 76 of the clutch housing and a shim 78 which bears against disc 70 to transmit the spring preload to the clutch plates supported by plug member 68.

Pinion gear 56 is spaced from differential case 20 by a predetermined clearance 80 to permit limited axial movement of the gear 56 which acts concurrently with opposite axial movement of the gear 46 and shaft 38 so as to increase the frictional contact of clutch members by urging plug member 68 against the clutch pack while its other end is positioned by disc 70 locked in place against shoulder 72 of the shaft 38.

Operation

Figure 2:
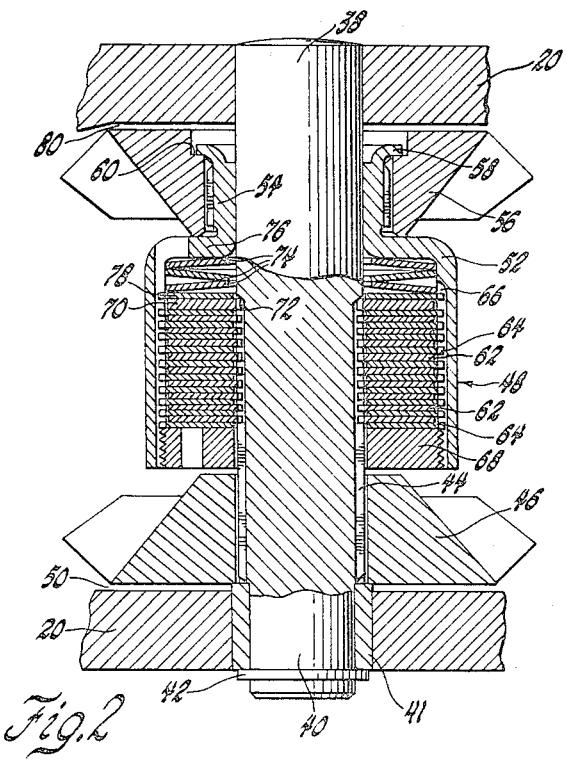
FIGURE 2 is a partial cross-sectional view taken generally along the plane indicated by the line 2—2 of FIGURE 1 and showing the clutch mounting arrangement.
Figure 4:
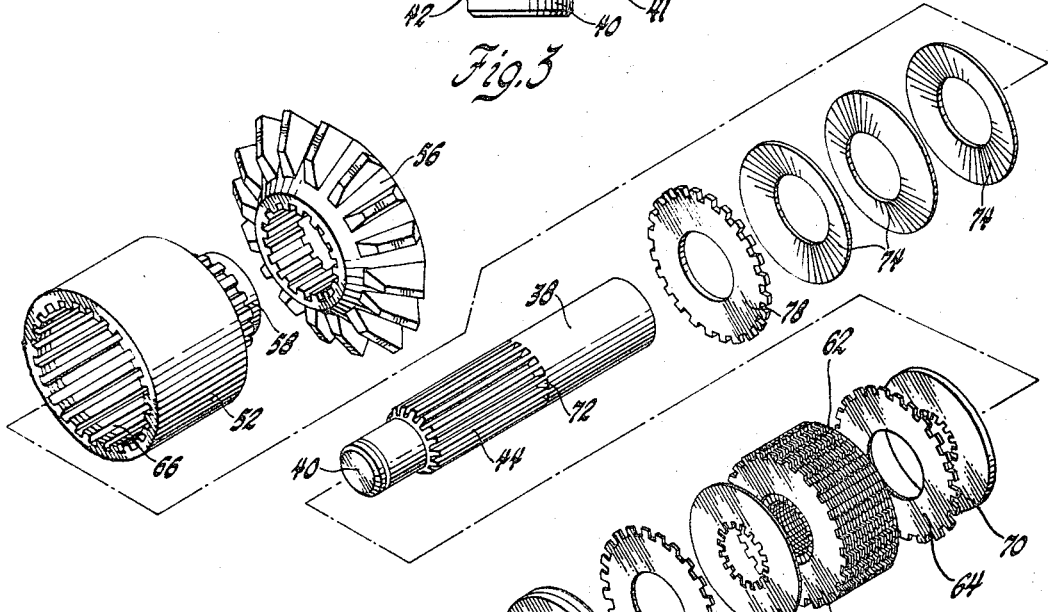
FIGURE 4 is an exploded pictorial view of the pinion gear and clutch arrangement of FIGURE 2 showing the various parts.

The operation of the arrangement heretofore described as shown in FIGURES 1, 2 and 4 is as follows: Under normal straight-line driving conditions, the rear wheels turn at equal speeds so that the differential assembly rotates as a unit without any relative rotation of the pinion and side gears. When, however the vehicle turns a corner or one of the wheels partially or completely loses traction, the wheels will rotate at different speeds, causing relative rotation of the pinion gears and side gears within the differential.

When such rotation occurs, pinion gear 56 rotates with clutch housing 52 in one direction while pinion gear 46 rotates with shaft member 38 in the opposite direction thereby causing opposite rotations of clutch discs 62 and 64 respectively. Such rotation is resisted by engagement of the clutch friction surfaces in at least a minimum amount established by the preload of the clutch pack by spring 74.

In addition, as torque is delivered through the gears to the axles or vice versa, there are separating forces generated between the gears in a well known manner, components of which force pinion gears 46 and 56 axially outwardly toward the wall of differential case 20 further compressing the clutch pack as previously described. These forces increase in proportion to the driving torque delivered thereby increasing the resistance to relative rotation of the clutch members and consequently of the pinions and side gears.

Thus, under all conditions of operation, a minimum amount of torque is deliverable to a wheel having traction whatever the traction conditions of the other wheel. Furthermore, as the torque delivered by the engine to the wheels is increased, the clutch arrangement automatically increases the amount of torque which can be delivered to a wheel having traction even through the other wheel may be slipping.

Figure 3:
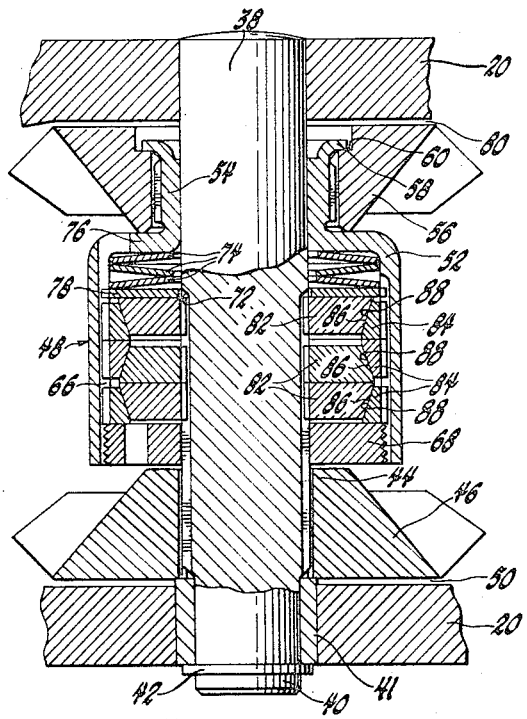
FIGURE 3 is a cross-sectional view similar to FIGURE 2 and showing an alternative embodiment of the clutch arrangement.

Embodiment of FIGURE 3

The embodiment disclosed in FIGURE 3 is identical to that of the other figures with the exception of the clutch pack itself and, accordingly, as to the other components like numerals are used to refer to like parts. In the FIGURE 3 embodiment, the clutch pack comprises a plurality of internal and external rings 82 and 84 respetively which are arranged in pairs having outer and inner conical surfaces 86 and 88 respectively in frictional engagement with one another. Inner rings 82 are splined to shaft 38 while outer rings 84 are splined to housing 52. The pairs of rings are alternately positioned end for end so that pairs of adjacent outer rings and pairs of adjacent inner rings engage one another with alternate spaces. This provides for limited axial compression of the clutch pack to increase the frictional engagement of the conical surfaces. The clutch pack is preloaded similarly to the disc clutch pack by Belleville springs 74 acting on a shim 78 which urges the clutch pack against plug 68.

In operation, the embodiment of FIGURE 3 is identical to the embodiment of the other figures. The only difference being the type of clutch member utilized and the shape of the friction engaging surfaces therein.

While the foregoing disclosure has been limited to two particular embodiments of the invention, it should be understood that numerous changes could be made by those skilled in the art within the spirit and scope of the invention. For instance, it is considered to be within the scope of the invention in its broader aspects to arrange pinion gear 46 and shaft 38 so that they are axially fixed though rotatably movable within the case. With such an arrangement, the total increase in clutch actuating force due to torque is caused by outward axial movement of the pinion 56.

Another variation is to fixedly mount the shaft 38 within the case 20 and arrange the pinion 46 for rotation on the shaft so that the members of the clutch pack connected to the shaft remain stationary during rotation of the other members with pinion gear 56. Alternately, the shaft may be fixed and an intermediate member rotatably mounted thereon may be splined both to pinion 46 and the internally splined members of the clutch pack thereby permitting rotation of said internally splined members with this pinion as in the disclosed arrangement without requiring rotation of shaft 38. In a further alternative, single cone members could be used in the clutch pack rather than multiple members.

These and other changes which may be made within the spirit and scope of the invention are intended to be included within its scope which is to be limited only by the language of the following claims.

I claim:
1. In a differential assembly of the type having
   a rotatably mounted case adapted to be rotated by externally powered means,
   a shaft carried in said case transverse to the axis of rotation,
   a pinion gear rotatably mounted on said shaft and
   a pair of side gears oppositely disposed within said case each in engagement with said pinion gear and mounted for relative rotation with respect to said case, said side gears being adapted to be connected with separate drive means such as the axle shafts of a motor vehicle,
   the improveemnt comprising
   clutch means connected with said pinion gear and adapted to resist relative rotation of said gears,
   said pinion gear being mounted for limited movement axially of said shaft and away from said side gears in response to the application of driving torque between said pinion gear and said side gears and said clutch means being arranged such that said axial movement of said pinion gear acts upon said clutch means to increase the resistance to relative rotation of said pinion and said side gears in proportion to the driving torque applied.

2. The combination of claim 1 wherein said clutch includes preload means providing a minimum initial resistance to realtive rotation of said gears.

3. The combination of claim 2 wherein said clutch means is carried on said shaft and positioned between said side gears.

4. The combination of claim 3 wherein said clutch means includes
   a housing splined to and rotatable with said pinion gear, and
   a plurality of first and second clutch members having friction surfaces in engagement with one another, said first clutch members being connected to and rotatable with said housing and said second clutch members being connected to said shaft,
   said housing being axially connected with said pinion gear and with said clutch members to urge said clutch members axially toward said pinion gear upon axial movement of said pinion gear away from said side gears, and
   means axially connecting said clutch members with said shaft to resist said axial movement of said clutch members so as to increase the force of engagement of said clutch members frictional surfaces,
   said preload means comprising spring means axially compressing said clutch members in said housing.

5. The combination of claim 4 wherein said first and second clutch members comprise annular plates splined to said housing and shaft respectively and arranged alternately in a stack within said housing.

6. The combination of claim 4 wherein
   said first clutch members comprise outer annular rings splined to said housing and having conical inner surfaces, and
   said second clutch members comprise inner annular rings splined to said shaft and having conical outer surfaces,
   said inner and outer rings being arranged in pairs with the conical surfaces of each pair in frictional engagement and slightly offset axially from one another to provide for axial compression of said clutch members.

7. The combination of claim 3 wherein said differential assembly includes a second pinion gear splined to said shaft and in engagement with said side gears, said shaft being rotatably mounted in said case.

8. The combination of claim 7 wherein said second pinion gear is axially movable outwardly from said side gears in response to the application of driving torque between said side gears and said second pinion gear,
   said second pinion gear and said clutch means being associated such that outward axial movement of said second pinion gear acts upon said clutch means to further increase the resistance to relative rotation of said pinion and said gears in proportion to the driving torque applied.

9. The combination of claim 4 wherein said differential assembly includes a second pinion gear splined to said shaft and in engagement with said side gears, said shaft being rotatably mounted in said case.

10. The combination of claim 9 wherein said second pinion gear is axially connected with said shaft such that both are movable together outwardly from said side gears in response to the application of driving torque between said side gears and said second pinion gear and in opposite direction from like movement of said first named pinion gear whereby to further increase the force of engagement of said clutch members.

11. The combination of claim 5 wherein said differential assembly includes a second pinion gear splined to said shaft and in engagement with said side gears, said shaft being rotatably mounted in said case.

References Cited

UNITED STATES PATENTS

| 1,979,414 | 11/1934 | Smith | 74—711 |
| 2,354,214 | 7/1944 | Lockwood | 74—711 |
| 2,431,272 | 11/1947 | Mynssen et al. | 74—711 |
| 2,855,806 | 10/1958 | Fallon | 74—710.5 |
| 2,883,884 | 4/1959 | Norton | 74—711 |
| 2,985,035 | 5/1961 | Toth | 74—711 |
| 3,326,064 | 6/1967 | Ordorica | 74—711 |

FOREIGN PATENTS 430,128  2/1948  Italy.

FRED C. MATTERN, Jr., *Primary Examiner.*
ARTHUR T. McKEON, *Assistant Examiner.*